United States Patent
Inoue et al.

(10) Patent No.: US 10,046,204 B2
(45) Date of Patent: Aug. 14, 2018

(54) GOLF BALL

(71) Applicant: DUNLOP SPORTS CO. LTD., Kobe-shi, Hyogo (JP)

(72) Inventors: Hidetaka Inoue, Kobe (JP); Toshiyuki Tarao, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 20 days.

(21) Appl. No.: 15/374,290

(22) Filed: Dec. 9, 2016

(65) Prior Publication Data

US 2017/0165527 A1 Jun. 15, 2017

(30) Foreign Application Priority Data

Dec. 11, 2015 (JP) ................. 2015-242037

(51) Int. Cl.
| | |
|---|---|
| A63B 37/06 | (2006.01) |
| A63B 37/00 | (2006.01) |
| C09D 175/08 | (2006.01) |
| C08G 18/48 | (2006.01) |
| C08G 18/62 | (2006.01) |

(Continued)

(52) U.S. Cl.
CPC ...... *A63B 37/0022* (2013.01); *A63B 37/0031* (2013.01); *A63B 37/0037* (2013.01); *A63B 37/0074* (2013.01); *A63B 37/0089* (2013.01); *C08G 18/4063* (2013.01); *C08G 18/4277* (2013.01); *C08G 18/4854* (2013.01); *C08G 18/4887* (2013.01); *C08G 18/6275* (2013.01); *C08G 18/6677* (2013.01); *C08G 18/725* (2013.01); *C08G 18/755* (2013.01); *C08G 18/7831* (2013.01); *C08G 18/792* (2013.01);
(Continued)

(58) Field of Classification Search
CPC .................................................. A63B 37/0022
USPC .......................................................... 473/378
See application file for complete search history.

(56) References Cited

U.S. PATENT DOCUMENTS 6,454,667 B1 * 9/2002 Iwami ............... A63B 37/0003
473/351
2011/0098133 A1 4/2011 Shiga et al.
(Continued)

FOREIGN PATENT DOCUMENTS

| JP | 2000-288125 A | 10/2000 |
|---|---|---|
| JP | 2011-92328 A | 5/2011 |

(Continued)

*Primary Examiner* — Raeann Gorden
(74) *Attorney, Agent, or Firm* — Birch, Stewart, Kolasch & Birch, LLP

(57) ABSTRACT

An object of the present invention is to provide a golf ball showing an increased spin rate on approach shots under a wet condition while maintaining a spin rate on approach shots under a dry condition. The present invention provides a golf ball comprising a golf ball body and a paint film formed on a surface of the golf ball body, wherein the paint film has a multi-layered construction composed of two or more layers, and a difference ($M_{out} - M_{in}$) between a 10% elastic modulus ($M_{out}$) of an outermost layer of the paint film and a 10% elastic modulus ($M_{in}$) of an innermost layer of the paint film is 25 kgf/cm² or more.

24 Claims, 6 Drawing Sheets

(51) Int. Cl.
*C08G 18/66* (2006.01)
*C08G 18/72* (2006.01)
*C08G 18/75* (2006.01)
*C08G 18/78* (2006.01)
*C08G 18/79* (2006.01)
*C09D 175/04* (2006.01)
*C08G 18/40* (2006.01)
*C08G 18/42* (2006.01)

(52) U.S. Cl.
CPC ......... *C09D 175/04* (2013.01); *C09D 175/08* (2013.01)

(56) References Cited

U.S. PATENT DOCUMENTS

2013/0203524 A1 8/2013 Tarao et al.
2013/0331205 A1* 12/2013 Tarao ................ C08G 18/4854
473/378

FOREIGN PATENT DOCUMENTS

| JP | 2013-176530 A | 9/2013 |
| JP | 2015-126772 A | 7/2015 |

* cited by examiner (a)

(b)

GOLF BALL

FIELD OF THE INVENTION

The present invention relates to a technology for improving spin performance of a golf ball.

DESCRIPTION OF THE RELATED ART

As a method for improving the approach performance of a golf ball, a method of appropriately selecting a cover material can be exemplified. Appropriately selecting a cover material can increase the spin rate on approach shots and improve the approach performance.

For example, Japanese Patent Publication No. 2011-092328 A discloses a golf ball comprising a core and a cover, wherein the cover is formed from a golf ball resin composition containing a polyurethane, and the polyurethane includes a polyol component having a number average molecular weight ranging from 200 to 1500 as a constituent component (refer to Claim 6 and paragraph 0011 in Japanese Patent Publication No. 2011-092328 A).

In addition, a paint film is formed on a surface of a golf ball body. Improving the paint film to improve the golf ball performance has been proposed. For example, Japanese Patent Publication No. 2000-288125 A discloses a golf ball having excellent durability, and comprising a core, a cover and at least one paint film formed on the cover, wherein the cover has a Shore D hardness ranging from 50 to 65 and a bending stiffness ranging from 1000 to 2000 kgf/cm$^2$, and at least an outermost layer of the paint film has a 10% elastic modulus ranging from 5 to 50 kgf/cm$^2$. With the technology disclosed in Japanese Patent Publication No. 2000-288125 A, the scuff resistance and cutting resistance of the ionomer cover are improved by the paint film (refer to Claim 1 and paragraphs 0006, 0013 in Japanese Patent Publication No. 2000-288125 A).

Japanese Patent Publication No. 2013-176530 A discloses a golf ball comprising a golf ball body and a paint film formed on a surface of the golf ball body, wherein the golf ball has a coefficient of friction ranging from 0.35 to 0.60 calculated using a contact force tester (refer to Claim 1 and paragraphs 0014 to 0031 in Japanese Patent Publication No. 2013-176530 A). Japanese Patent Publication No. 2015-126772 A discloses a golf ball comprising a golf ball body and a paint film formed on a surface of the golf ball body, wherein a base resin constituting the paint film is a polyurethane obtained by a reaction between a polyol composition and a polyisocyanate composition, the polyol composition contains a urethane polyol including a polyether diol having a number average molecule weight ranging from 800 to 3000 as a constituent component, the paint film has a 10% elastic modulus of 100 kgf/cm$^2$ or less, and the 10% elastic modulus (kgf/cm$^2$) (Y) of the paint film and a molar ratio (NCO/OH) (X) of NCO groups in the polyisocyanate composition to OH groups in the polyol composition satisfy a relationship of Y≤200× X−75 (refer to Claim 1 and paragraphs 0035 to 0037 in Japanese Patent Publication No. 2015-126772 A).

SUMMARY OF THE INVENTION

Controlling the properties of the cover material or the paint film can increase the spin rate on approach shots under a dry condition. However, there is still room for improvement on the spin rate on approach shots under a wet condition. The present invention has been made in view of the abovementioned circumstances, and an object of the present invention is to provide a golf ball showing an increased spin rate on approach shots under a wet condition while maintaining a spin rate on approach shots under a dry condition.

The present invention that has solved the above problems provides a golf ball comprising a golf ball body and a paint film formed on a surface of the golf ball body, wherein the paint film has a multi-layered construction composed of two or more layers, and a difference ($M_{out}-M_{in}$) between a 10% elastic modulus ($M_{out}$) of an outermost layer of the paint film and a 10% elastic modulus ($M_{in}$) of an innermost layer of the paint film is 25 kgf/cm$^2$ or more. If the paint film has a soft layer and a hard layer, the spin rate on approach shots both under a dry condition and under a wet condition is increased. The 10% elastic modulus ($M_{out}$) of the outermost layer of the paint film is preferably 100 kgf/cm$^2$ or more. If the outermost layer of the paint film is hard, the resultant golf ball has enhanced stain resistance.

According to the present invention, a golf ball having excellent performance on approach shots under a dry condition and under a wet condition is obtained.

DESCRIPTION OF THE PREFERRED EMBODIMENT

Figure 1:
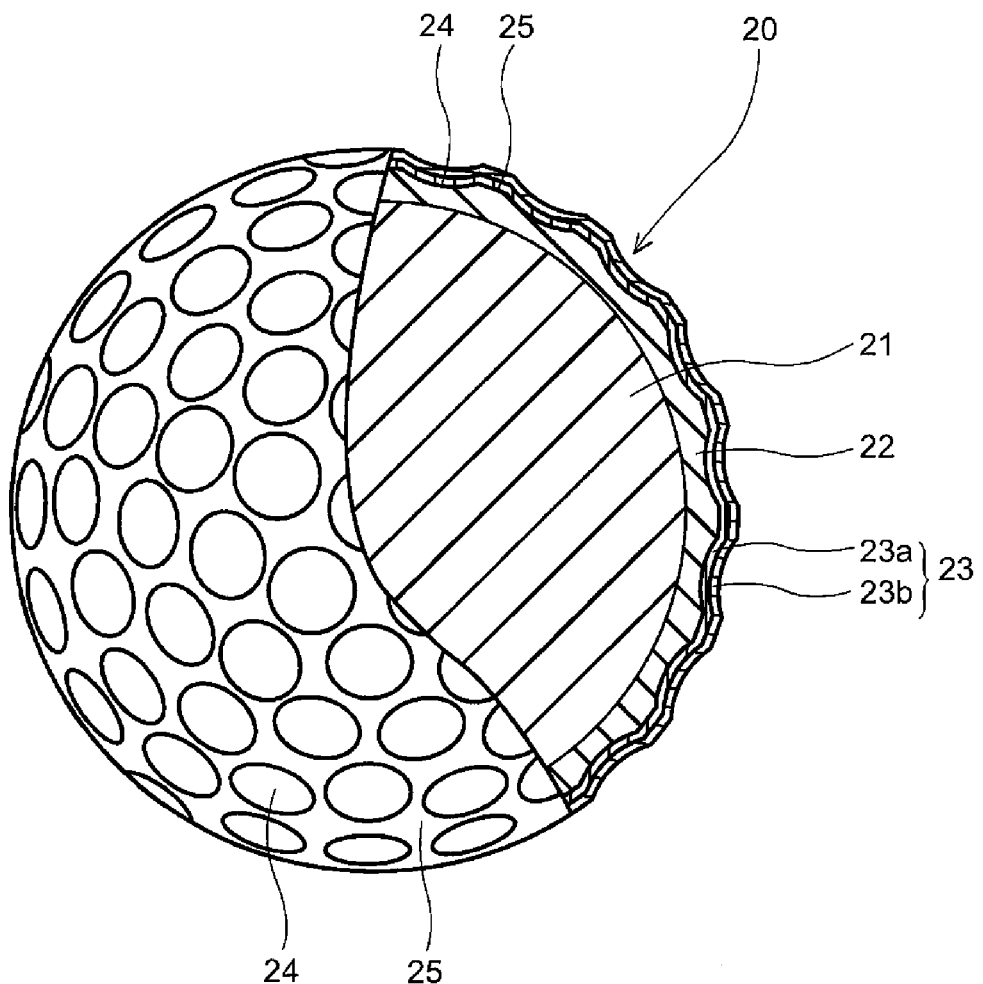
FIG. 1 is a partially cutaway cross-sectional view of a golf ball according to an embodiment of the present invention.

The present invention provides a golf ball comprising a golf ball body and a paint film formed on a surface of the golf ball body, wherein the paint film has a multi-layered construction composed of two or more layers, and a difference ($M_{out}-M_{in}$) between a 10% elastic modulus ($M_{out}$) of an outermost layer of the paint film and a 10% elastic modulus ($M_{in}$) of an innermost layer of the paint film is 25 kgf/cm$^2$ or more. If the paint film has a soft layer, the spin rate on approach shots under a dry condition is increased, and if the paint film has a hard layer, the spin rate on approach shots under a wet condition is increased. Thus, if the paint film has a soft layer and a hard layer, the spin rate on approach shots both under a dry condition and under a wet condition is increased.

The difference ($M_{out}-M_{in}$) is 25 kgf/cm$^2$ (2.5 MPa) or more, preferably 45 kgf/cm$^2$ (4.4 MPa) or more, more preferably 65 kgf/cm$^2$ (6.4 MPa) or more, and is preferably 400 kgf/cm$^2$ (39.2 MPa) or less, more preferably 375 kgf/cm$^2$ (36.8 MPa) or less, even more preferably 350 kgf/cm$^2$ (34.3 MPa) or less. If the difference ($M_{out}-M_{in}$) is less than 25 kgf/cm$^2$, there is a poor balance between the spin performance under a dry condition and the spin performance under a wet condition, and if the difference ($M_{out}-M_{in}$) exceeds 400 kgf/cm$^2$, delamination inside the paint film may occur, and thus the paint film may have poor durability.

The 10% elastic modulus (tensile stress at 10% strain) ($M_{out}$) of the outermost layer of the paint film is preferably 100 kgf/cm$^2$ (9.8 MPa) or more, more preferably 125 kgf/cm$^2$ (12.3 MPa) or more, even more preferably 150 kgf/cm$^2$ (14.7 MPa) or more, and is preferably 500 kgf/cm$^2$ (49.0 MPa) or less, more preferably 450 kgf/cm$^2$ (44.1 MPa) or less, even more preferably 400 kgf/cm$^2$ (39.2 MPa) or less. If the outermost layer of the paint film has a 10% elastic modulus ($M_{out}$) of 100 kgf/cm$^2$ or more, the spin performance under a wet condition is enhanced. Further, the hard outermost layer of the paint film enhances stain resistance, thereby reducing contamination by grass juice. If the outermost layer of the paint film has a 10% elastic modulus ($M_{out}$) of 500 kgf/cm$^2$ or less, the paint film has better durability. It is noted that if the outermost layer of the paint film has an excessively high 10% elastic modulus, the paint film becomes excessively hard, and thus crack may occur in the paint film.

The maximum elongation (strain at break) of the outermost layer of the paint film is preferably 30% or more, more preferably 40% or more, even more preferably 50% or more, and is preferably 200% or less, more preferably 175% or less, even more preferably 150% or less. If the outermost layer of the paint film has a maximum elongation of 30% or more, occurrence of crack in the paint film may be suppressed, and thus the paint film has better durability. If the outermost layer of the paint film has a maximum elongation of 200% or less, the spin performance under a wet condition is further enhanced.

The 10% elastic modulus ($M_{in}$) of the innermost layer of the paint film is preferably 5 kgf/cm$^2$ (0.5 MPa) or more, more preferably 10 kgf/cm$^2$ (1.0 MPa) or more, even more preferably 15 kgf/cm$^2$ (1.5 MPa) or more, and is preferably less than 100 kgf/cm$^2$ (9.8 MPa), more preferably 90 kgf/cm$^2$ (8.8 MPa) or less, even more preferably 80 kgf/cm$^2$ (7.8 MPa) or less. If the innermost layer of the paint film has a 10% elastic modulus ($M_{in}$) of 5 kgf/cm$^2$ or more, excessive deformation of the paint film at hitting is suppressed, and the golf ball spins more easily on approach shots. If the innermost layer of the paint film has a 10% elastic modulus ($M_{in}$) of 100 kgf/cm$^2$ or less, the spin performance under a dry condition is further enhanced.

The maximum elongation (strain at break) of the innermost layer of the paint film is preferably 100% or more, more preferably 120% or more, even more preferably 140% or more, and is preferably 500% or less, more preferably 450% or less, even more preferably 400% or less. If the innermost layer of the paint film has a maximum elongation of 100% or more, the spin performance under a dry condition is further enhanced and the shot feeling becomes better. If the innermost layer of the paint film has a maximum elongation of 500% or less, the spin performance under a wet condition is further enhanced.

The paint film is not particularly limited, as long as the paint film has a multi-layered construction composed of two or more layers, but the paint film preferably comprises four or less layers, more preferably three or less layers, even more preferably two layers. If the paint film comprises four or less layers, the painting process does not become excessively complicated, and thus productivity is better. When the paint film comprises three or more layers, the 10% elastic modulus of the layer other than the innermost layer and the outermost layer is preferably 5 kgf/cm$^2$ (0.5 MPa) or more, more preferably 10 kgf/cm$^2$ (1.0 MPa) or more, even more preferably 15 kgf/cm$^2$ (1.5 MPa) or more, and is preferably 500 kgf/cm$^2$ (49.0 MPa) or less, more preferably 450 kgf/cm$^2$ (44.1 MPa) or less, even more preferably 400 kgf/cm$^2$ (39.2 MPa) or less. In addition, it is preferred that the 10% elastic modulus of the layer other than the innermost layer and the outermost layer is higher than the 10% elastic modulus of the innermost layer, and is lower than the 10% elastic modulus of the outermost layer.

The total thickness of the paint film is preferably 10 μm or more, more preferably 15 μm or more, even more preferably 20 μm or more, and is preferably 60 μm or less, more preferably 50 μm or less, even more preferably 40 μm or less. If the paint film has a total thickness of 10 μm or more, both of the spin performance under a dry condition and the spin performance under a wet condition are further enhanced, and if the paint film has a total thickness of 60 μm or less, the paint film has little influence on the dimple pattern formed on the cover, and thus the flight performance becomes better.

The thickness ($T_{out}$) of the outermost layer of the paint film is preferably 5 μm or more, more preferably 7.5 μm or more, even more preferably 10 μm or more, and is preferably 30 μm or less, more preferably 27.5 μm or less, even more preferably 25 μm or less. If the outermost layer of the paint film has a thickness ($T_{out}$) of 5 μm or more, the spin rate under a wet condition is further increased, and if the outermost layer of the paint film has a thickness ($T_{out}$) of 30 μm or less, the spin rate on driver shots is suppressed.

The thickness ($T_{in}$) of the innermost layer of the paint film is preferably 5 μm or more, more preferably 7.5 μm or more, even more preferably 10 μm or more, and is preferably 30 μm or less, more preferably 27.5 μm or less, even more preferably 25 μm or less. If the innermost layer of the paint film has a thickness ($T_{in}$) of 5 μm or more, the spin rate under a dry condition is further increased, and if the innermost layer of the paint film has a thickness ($T_{in}$) of 30 μm or less, the spin rate on driver shots is suppressed.

The ratio ($T_{out}/T_{in}$) of the thickness ($T_{out}$) of the outermost layer of the paint film to the thickness ($T_{in}$) of the innermost layer of the paint film is preferably 0.2 or more, more preferably 0.3 or more, even more preferably 0.4 or more, and is preferably 5 or less, more preferably 4 or less, even more preferably 3 or less. If the ratio ($T_{out}/T_{in}$) is 0.2 or more, lowering in the spin rate under a dry condition is suppressed, and if the ratio ($T_{out}/T_{in}$) is 5 or less, the increase effect of the spin rate under a wet condition is further enhanced.

Examples of the base resin constituting the paint film include a urethane resin, an epoxy resin, an acrylic resin, a vinyl acetate resin, and a polyester resin. Among them, the urethane resin is preferred. In the case that the base resin constituting the paint film is the urethane resin, tensile properties of the paint film can be adjusted by the formulation of the polyol composition or polyisocyanate composition, or the mixing ratio thereof. It is noted that the base resin constituting each layer of the paint film may be different from each other, but it is preferred that the base resin constituting all layers of the paint film is the urethane resin.

(Polyurethane Paint)

The paint film is preferably formed from a paint containing a polyol composition and a polyisocyanate composition. Examples of the paint include a so-called two-component curing type urethane paint containing a polyol as a base material and a polyisocyanate as a curing agent.

(Polyol Composition)

The polyol composition contains a polyol compound. The polyol compound is a compound having at least two hydroxyl groups in the molecule thereof. Examples of the polyol compound include a compound having a hydroxyl group at the terminal of the molecule, and a compound having a hydroxyl group at a part other than the terminal of the molecule. The polyol compound may be used solely or as a mixture of at least two of them.

Examples of the compound having a hydroxyl group at the terminal of the molecule include a low molecular weight polyol having a molecular weight of less than 500 and a high molecular weight polyol having a number average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol, a polyester polyol, a polycaprolactone polyol, a polycarbonate polyol, a urethane polyol, and an acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The urethane polyol is a compound having a plurality of urethane bonds in the molecule thereof, and having at least two hydroxyl groups in one molecule. Examples of the urethane polyol include a urethane prepolymer obtained by a reaction between a first polyol component and a first polyisocyanate component, under a condition that the hydroxyl group of the first polyol component is excessive to the isocyanate group of the first polyisocyanate component.

Examples of the first polyol component constituting the urethane polyol include a polyether diol, a polyester diol, a polycaprolactone diol, and a polycarbonate diol, but the polyether diol is preferred. Examples of the polyether diol include polyoxyethylene glycol, polyoxypropylene glycol, and polyoxytetramethylene glycol. Among them, polyoxytetramethylene glycol is preferred.

The number average molecular weight of the polyether diol is preferably 600 or more, more preferably 650 or more, even more preferably 700 or more, and is preferably 3000 or less, more preferably 2500 or less, even more preferably 2000 or less. If the number average molecular weight of the polyether diol is 600 or more, the distance between crosslinking points in the paint film becomes long and the paint film becomes soft, thus the spin performance is enhanced. If the number average molecular weight of the polyether diol is 3000 or less, the distance between crosslinking points in the paint film does not become excessively long, and thus the stain resistance of the paint film becomes better. The number average molecular weight of the polyol component can be measured, for example, by gel permeation chromatography (GPC), using polystyrene as a standard material, tetrahydrofuran as an eluate, and an organic solvent system GPC column (e.g., "Shodex (registered trademark) KF series" available from Showa Denko K.K.) as a column.

The first polyol component may include a low molecular weight polyol having a molecular weight of less than 500. Examples of the low molecular weight polyol include a diol such as ethyleneglycol, diethylene glycol, triethylene glycol, 1,3-butanediol, 1,4-butanediol, neopentyl glycol, and 1,6-hexanediol, and a triol such as glycerin, trimethylolpropane, and hexanetriol. The low molecular weight polyol may be used solely or as a mixture of at least two of them.

The first polyol component constituting the urethane polyol preferably includes a triol component and a diol component. As the triol component, trimethylolpropane is preferred. The mixing ratio (triol component/diol component) of the triol component to the diol component is preferably 0.2 or more, more preferably 0.5 or more, and is preferably 6.0 or less, more preferably 5.0 or less in a mass ratio.

The first polyisocyanate component constituting the urethane polyol is not limited, as long as the first polyisocyanate component has at least two isocyanate groups. Examples of the first polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The first polyisocyanate may be used solely or as a mixture of at least two of them.

The amount of the polyether diol in the urethane polyol is preferably 70 mass % or more, more preferably 72 mass % or more, even more preferably 75 mass % or more. The polyether diol forms a soft segment in the paint film. Therefore, if the amount of the polyether diol is 70 mass % or more, the obtained golf ball has further enhanced spin performance.

The weight average molecular weight of the urethane polyol is preferably 5000 or more, more preferably 5300 or more, even more preferably 5500 or more, and is preferably 20000 or less, more preferably 18000 or less, even more preferably 16000 or less. If the weight average molecular weight of the urethane polyol is 5000 or more, the distance between crosslinking points in the paint film becomes long and the paint film becomes soft, thus the spin performance is enhanced. If the weight average molecular weight of the urethane polyol is 20000 or less, the distance between crosslinking points in the paint film does not become excessively long, and thus the stain resistance of the paint film becomes better. It is noted that the weight average molecular weight of the urethane polyol can be measured, for example, by gel permeation chromatography (GPC), using polystyrene as a standard material, tetrahydrofuran as an eluate, and an organic solvent system GPC column (e.g., "Shodex (registered trademark) KF series" available from Showa Denko K.K.) as a column.

The hydroxyl value of the urethane polyol is preferably 10 mg KOH/g or more, more preferably 15 mg KOH/g or more, even more preferably 20 mg KOH/g or more, and is preferably 200 mg KOH/g or less, more preferably 190 mg KOH/g or less, even more preferably 180 mg KOH/g or less. The hydroxyl value can be measured according to JIS K 1557-1, for example, by an acetylation method.

Examples of the compound having a hydroxyl group at a part other than the terminal of the molecule include a modified polyrotaxane having a hydroxyl group and a hydroxyl group-modified vinyl chloride-vinyl acetate copolymer.

The modified polyrotaxane having a hydroxyl group has a cyclodextrin, a linear molecule piercing through the cyclic structure of the cyclodextrin, and having blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin and keeping the cyclic structure of the cyclodextrin to be movable along and rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule can easily react with the blocking group. Examples of the functional group include a hydroxyl group, carboxyl group, amino group, and thiol group.

The blocking groups are not particularly limited, as long as they are located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number (inclusion amount) of the cyclodextrins pierced by the linear molecule preferably ranges from 0.06 to 0.61, more preferably ranges from 0.11 to 0.48, even more preferably ranges from 0.24 to 0.41, if the maximum inclusion amount is deemed as 1. This is because if the inclusion amount is less than 0.06, the pulley effect may not be exerted, and if the inclusion amount exceeds 0.61, the cyclodextrins are very densely located, so that the movability of the cyclodextrin may decrease.

As the polyrotaxane, a polyrotaxane having at least a part of hydroxyl groups of the cyclodextrin being modified with a caprolactone chain, is preferred. This is because if at least a part of hydroxyl groups of the cyclodextrin of the polyrotaxane is modified with the caprolactone, steric hindrance between the polyrotaxane and the polyisocyanate is alleviated, so that the efficiency of a reaction with the polyisocyanate increases.

As the above modification, for example, the hydroxyl groups of the cyclodextrin are treated with propylene oxide to hydroxylalkylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—C$_3$H$_6$—O— group. "n" represents the degree of polymerization, and is preferably a natural number of 1 to 100, more preferably a natural number of 2 to 70, even more further preferably a natural number of 3 to 40. At another terminal of the caprolactone chain, a hydroxyl group is formed through the ring-opening polymerization. The hydroxyl group at the terminal of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the hydrophobicity of the polyrotaxane increases, and the reactivity with the polyisocyanate increases.

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the reactivity with the polyisocyanate increases, and thus the durability of the paint film becomes more favorable.

The total molecular weight of the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the weight average molecular weight is 30,000 or more, the paint film has sufficient strength, and if the weight average molecular weight is 3,000,000 or less, the paint film has sufficient flexibility and thus approach performance of the golf ball increases. It is noted that the weight average molecular weight of the polyrotaxane can be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone include SeRM super polymer SH3400P, SH2400P, and SH1310P available from Advanced Softmaterials Inc.

The hydroxyl group modified vinyl chloride-vinyl acetate copolymer can adjust the adhesion of the paint film while maintaining the scuff resistance of the paint film. The hydroxyl group modified vinyl chloride-vinyl acetate copolymer is obtained, for example, by a method of copolymerizing vinyl chloride, vinyl acetate and a monomer having a hydroxyl group (e.g., polyvinyl alcohol, hydroxyalkyl acrylate), or by a method of partially or completely saponifying a vinyl chloride-vinyl acetate copolymer.

The amount of the vinyl chloride component in the hydroxyl group modified vinyl chloride-vinyl acetate copolymer is preferably 1 mass % or more, more preferably 20 mass % or more, even more preferably 50 mass % or more, and is preferably 99 mass % or less, more preferably 95 mass % or less. Specific examples of the hydroxyl group modified vinyl chloride-vinyl acetate copolymer include Solbin (registered trademark) A, Solbin AL, and Solbin TA3 available from Nissin Chemical Industry Co., Ltd.

Preferable embodiments of the polyol composition are an embodiment containing a urethane polyol, wherein the urethane polyol includes a polyether diol having a number average molecular weight in a range from 600 to 3000 as a constituent component (embodiment 1); and an embodiment containing a polyrotaxane, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—C$_3$H$_6$—O— group (embodiment 2).

In the embodiment 1, the amount of the urethane polyol in the polyol component of the polyol composition is preferably 60 mass % or more, more preferably 70 mass % or more, even more preferably 80 mass % or more. It is also preferred that the polyol component of the polyol composition of the embodiment 1 consists of the urethane polyol.

In the embodiment 2, the amount of the polyrotaxane in the polyol component of the polyol composition is preferably 10 mass % or more, more preferably 15 mass % or more, even more preferably 20 mass % or more, and is preferably 100 mass % or less, more preferably 90 mass % or less, even more preferably 85 mass % or less.

The polyol composition of the embodiment 2 preferably contains a polycaprolactone polyol. The mass ratio (polycaprolactone polyol/polyrotaxane) of the polycaprolactone polyol to the polyrotaxane is preferably 0/100 or more, more preferably 5/95 or more, even more preferably 10/90 or more, and is preferably 90/10 or less, more preferably 85/15 or less, even more preferably 80/20 or less.

The polyol composition of the embodiment 2 preferably contains the hydroxyl group modified vinyl chloride-vinyl acetate copolymer. The amount of the hydroxyl group modified vinyl chloride-vinyl acetate copolymer in the polyol component of the polyol composition is preferably 4 mass % or more, more preferably 8 mass % or more, and is preferably 50 mass % or less, more preferably 45 mass % or less.

(Polyisocyanate Composition)

Next, the polyisocyanate composition will be described. The polyisocyanate composition contains a polyisocyanate compound. Examples of the polyisocyanate compound include a compound having at least two isocyanate groups.

Examples of the polyisocyanate compound include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); an alicyclic diisocyanate or aliphatic diisocyanate such as 4,4'-dicyclohexylmethane diisocyanate (H$_{12}$MDI), hydrogenated xylylenediisocyanate (H$_6$XDI), hexamethylene diisocyanate (HDI), isophorone diisocyanate (IPDI), and norbornene diisocyanate (NBDI); and a triisocyanate such as an allophanate-modified product, a biuret-modified product, an isocyanurate and an adduct of the above diisocyanate. The polyisocyanate may be used solely or as a mixture of at least two of them.

The allophanate-modified product is, for example, a triisocyanate obtained by further reacting a diisocyanate with a urethane bond formed through a reaction between a diisocyanate and a low molecular weight diol. The adduct is a triisocyanate obtained through a reaction between a diisocyanate and a low molecular weight triol such as trimethylolpropane or glycerin. The biuret-modified products is, for example, a triisocyanate having a biuret bond and represented by the following formula (1). The isocyanurate of diisocyanate is, for example, a triisocyanate represented by the following formula (2).

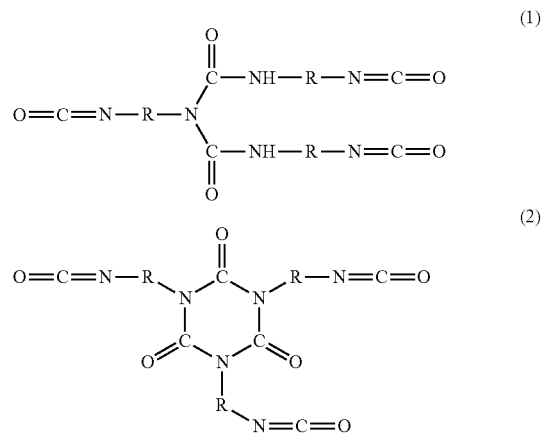

In the formulae (1) and (2), R represents a residue where the isocyanate group is removed from the diisocyanate.

Preferable examples of the triisocyanate include an isocyanurate of hexamethylene diisocyanate, a biuret-modified product of hexamethylene diisocyanate, and an isocyanurate of isophorone diisocyanate.

In the present invention, the polyisocyanate composition preferably contains a triisocyanate compound. The amount of the triisocyanate compound in the polyisocyanate component of the polyisocyanate composition is preferably 50 mass % or more, more preferably 60 mass % or more, even more preferably 70 mass % or more. It is most preferable that the polyisocyanate component of the polyisocyanate composition consists of the triisocyanate compound.

The amount (NCO %) of the isocyanate group of the polyisocyanate contained in the polyisocyanate composition is preferably 0.5 mass % or more, more preferably 1 mass % or more, even more preferably 2 mass % or more, and is preferably 45 mass % or less, more preferably 40 mass % or less, even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX, and Coronate HK available from Nippon Polyurethane Industry Co., Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

In the curing reaction of the curing type paint composition, the molar ratio (NCO group/OH group) of the isocyanate group (NCO group) of the curing agent to the hydroxyl group (OH group) of the base material is preferably 0.1 or more, more preferably 0.2 or more. If the molar ratio (NCO group/OH group) is less than 0.1, the curing reaction may become insufficient. Further, if the molar ratio (NCO group/OH group) is too large, the amount of the isocyanate group is excessive, and the obtained paint film may become hard and fragile as well as the appearance of the obtained paint film may deteriorate. Thus, the molar ratio (NOC group/OH group) is preferably 1.6 or less, more preferably 1.5 or less, even more preferably 1.4 or less. The reason why the appearance of the obtained paint film deteriorates if the amount of the isocyanate group in the paint becomes excessive is that an excessive amount of the isocyanate group may promote a reaction between the moisture in the air and the isocyanate group, thereby generating a lot of carbon dioxide gas.

When the polyol composition of the embodiment 1 is used as the polyol composition, the polyisocyanate composition preferably contains the biuret-modified product of hexamethylene diisocyanate, the isocyanurate of hexamethylene diisocyanate, or the isocyanurate of isophorone diisocyanate. In the case that the biuret-modified product of hexamethylene diisocyanate and the isocyanurate of hexamethylene diisocyanate are used in combination, the mass ratio (biuret-modified product/isocyanurate) preferably ranges from 20/40 to 40/20, more preferably ranges from 25/35 to 35/25.

When the polyol composition of the embodiment 2 is used as the polyol composition, the polyisocyanate composition preferably contains the isocyanurate of hexamethylene diisocyanate.

The paint may be either a waterborne paint mainly containing water as a dispersion medium or a solvent-based paint mainly containing an organic solvent as a dispersion medium, but is preferably the solvent-based paint. In the case of the solvent-based paint, examples of the preferable solvent include toluene, isopropyl alcohol, xylene, methylethyl ketone, methylethylisobutyl ketone, ethylene glycol monomethyl ether, ethylbenzene, propylene glycol monomethyl ether, isobutyl alcohol, and ethyl acetate. The solvent may be added in either of the polyol composition and the polyisocyanate composition, and in light of uniformly performing the curing reaction, the solvent is preferably added in the polyol composition and the polyisocyanate composition, respectively.

The paint preferably further includes a modified silicone. If the modified silicone is included as a leveling agent, unevenness of the coated surface can be reduced, and thus a smooth coated surface can be formed on the surface of the golf ball. Examples of the modified silicone include a modified silicone having an organic group being introduced to a side chain or a terminal of a polysiloxane skeleton, a polysiloxane block copolymer obtained by copolymerizing a polyether block and/or a polycaprolactone block, etc. with a polysiloxane block, and a modified silicone having an organic group being introduced to a side chain or a terminal of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 available from Gelest, Inc.

A conventionally known catalyst can be employed for the curing reaction. Examples of the catalyst include a monoamine such as triethyl amine and N,N-dimethylcyclohexylamine; a polyamine such as N,N,N',N'-tetramethylethylene diamine and N,N,N',N'',N''-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferred, and in particular, dibutyl tin dilaurate is preferably used.

The paint may further include additives generally included in the paint for a golf ball, such as a filler, ultraviolet absorber, antioxidant, light stabilizer, fluorescent brightener, anti-blocking agent, leveling agent, slip agent, and viscosity modifier, where necessary.

Next, the method of applying the curing type paint composition of the present invention will be described. The method of applying the curing type paint composition is not limited, a conventionally known method can be adopted, and examples thereof include a spray coating and electrostatic coating.

In the case of performing the spray coating with an air gun, the polyol composition and the polyisocyanate composition are fed with respective pumps and continuously mixed with a line mixer located in the stream line just before the air gun, and the obtained mixture is air-sprayed. Alternatively, the polyol composition and the polyisocyanate composition are air-sprayed respectively with an air spray system provided with a device for controlling the mixing ratio thereof. The paint application may be conducted by spraying the paint one time or overspreading the paint multiple times.

The curing type paint applied to the golf ball body can be dried, for example, at a temperature ranging from 30° C. to 70° C. for 1 hour to 24 hours to form the paint film.

The golf ball according to the present invention is not particularly limited, as long as it is a golf ball comprising a golf ball body and a paint film formed on a surface of the golf ball body. The construction of the golf ball body is not particularly limited, and the golf ball body may be a one-piece golf ball, a two-piece golf ball, a three-piece golf ball, a four-piece golf ball, a multi-piece golf ball such as a five-piece golf ball and a golf ball comprising more than five pieces, or a wound golf ball. The present invention can be applied appropriately to any one of the above golf balls.

FIG. 1 is a partially cutaway view showing a golf ball 20 according to one embodiment of the present invention. The golf ball 20 comprises a spherical core 21, a cover 22 covering the spherical core 21, and a paint film 23 formed on a surface of the cover 22. The paint film 23 comprises an inner layer 23a and an outer layer 23b. On the surface of the cover 22, a plurality of dimples 24 are formed. On the surface of the cover 22, a part other than the dimples 24 is a land 25.

The one-piece golf ball body and the core used for a wound golf ball, two-piece golf ball and multi-piece golf ball will be explained.

The one-piece golf ball body or the core may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent to be used is preferably 20 parts by mass or more and 50 parts by mass or less, with respect to 100 parts by mass of the base rubber. In the case that the α,β-unsaturated carboxylic acid having 3 to 8 carbon atoms is used as the co-crosslinking agent, a metal compound (e.g. magnesium oxide) is preferably used in combination. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides (e.g. diphenyl disulfide, bis(pentabromophenyl)persulfide), thiophenols or thionaphthols (e.g. 2-thionaphthol) may be preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, an aliphatic carboxylic acid or an aromatic carboxylic acid (e.g. benzoic acid) may be used. The amount of the carboxylic acid and/or the salt thereof is preferably 1 part by mass or more and 40 parts by mass or less, with respect to 100 parts by mass of the base rubber.

The core rubber composition may further contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

The golf ball body is preferably a golf ball body comprising a core and a cover covering the core. In this case, the cover preferably has a hardness of 60 or less, more preferably 55 or less, even more preferably 50 or less, most preferably 45 or less in Shore D hardness. If the cover has a hardness of 60 or less in Shore D hardness, the spin rate on approach shots further increases. The lower limit of the hardness of the cover is preferably, but not particularly limited to, 10, more preferably 15, even more preferably 20 in Shore D hardness. The hardness of the cover is a slab hardness obtained by measuring a cover composition for forming the cover molded into a sheet form.

The thickness of the cover is preferably 0.1 mm or more, more preferably 0.2 mm or more, even more preferably 0.3 mm or more, and is preferably 1.0 mm or less, more preferably 0.9 mm or less, even more preferably 0.8 mm or less. If the thickness of the cover is 0.1 mm or more, the shot feeling of the golf ball becomes better, and if the thickness of the cover is 1.0 mm or less, the resilience of the golf ball can be maintained.

The 10% elastic modulus of the cover is preferably less than 120 kgf/cm$^2$ (11.8 MPa), more preferably 110 kgf/cm$^2$ (10.8 MPa) or less, even more preferably 100 kgf/cm$^2$ (9.8 MPa) or less. If the 10% elastic modulus is less than 120 kgf/cm$^2$, the cover is soft and the spin rate on approach shots further increases. The lower limit of the 10% elastic modulus of the cover is not particularly limited, but is preferably 5 kgf/cm$^2$ (0.49 MPa), more preferably 10 kgf/cm$^2$ (0.98 MPa). If the 10% elastic modulus is excessively low, the cover becomes too soft, and feeling become worse.

The resin component constituting the cover is not particularly limited, and examples thereof include various resins such as an ionomer resin, a polyester resin, a urethane resin and a polyamide resin; a thermoplastic polyamide elastomer having a trade name of "Pebax (registered trademark) (e.g. "Pebax 2533")" commercially available from Arkema Inc.; a thermoplastic polyester elastomer having a trade name of "Hytrel (registered trademark) (e.g. "Hytrel 3548" and "Hytrel 4047")" commercially available from Du Pont-Toray Co., Ltd.; a thermoplastic polyurethane elastomer having a trade name of "Elastollan (registered trademark) (e.g. "Elastollan XNY97A")" available from BASF Japan Ltd.; a thermoplastic styrene elastomer having a trade name of "Rabalon (registered trademark)" and a thermoplastic polyester elastomer having a trade name of "Primalloy" commercially available from Mitsubishi Chemical Corporation. These cover materials may be used solely, or two or more of these cover materials may be used in combination.

Among them, the resin component constituting the cover is preferably the polyurethane resin and the ionomer resin, particularly preferably the polyurethane resin. When the resin component constituting the cover includes the polyurethane resin, the amount of the polyurethane resin in the resin component is preferably 50 mass % or more, more preferably 70 mass % or more, even more preferably 90 mass % or more. When the resin component constituting the cover includes the ionomer resin, the amount of the ionomer resin in the resin component is preferably 50 mass % or more, more preferably 70 mass % or more, even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. On the other hand, the thermosetting polyurethane (two-component curing type polyurethane) is a polyurethane obtained by polymerization through a reaction between a low-molecular weight urethane prepolymer and a curing agent (chain extender) when molding the cover. The thermosetting polyurethane includes a polyurethane having a linear chain structure or a polyurethane having a three-dimensional crosslinked structure depending on the number of the functional group of the prepolymer or the curing agent (chain extender) to be used. As the polyurethane, the thermoplastic elastomer is preferable.

The cover may include a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of the dimples formed on the cover is preferably 200 or more and 500 or less. If the total number of the dimples is less than 200, the dimple effect is hardly obtained. If the total number exceeds 500, the dimple effect is hardly obtained because the size of the respective dimples is small. The shape (shape in a plan view) of the formed dimple includes, for example, without limitation, a circle; a polygonal shape such as a roughly triangular shape, a roughly quadrangular shape, a roughly pentagonal shape, and a roughly hexagonal shape; and another irregular shape. The shape may be employed solely, or two or more of the shapes may be employed in combination.

In the case that the golf ball is a three-piece golf ball, a four-piece golf ball, and a multi-piece golf ball such as a five-piece golf ball and a golf ball comprising more than five pieces, examples of the material for an intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an $\alpha,\beta$-unsaturated carboxylic acid; and a product obtained by neutralizing, with a metal ion, at least a part of carboxyl groups in a terpolymer composed of ethylene, an $\alpha,\beta$-unsaturated carboxylic acid and an $\alpha,\beta$-unsaturated carboxylic acid ester. The intermediate layer may further include a weight adjusting agent such as barium sulfate and tungsten, an antioxidant, and a pigment. The intermediate layer may be referred to as an inner cover layer or an outer core depending on the construction of the golf ball.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, more preferably 42.80 mm or less. The golf ball preferably has a mass of 40 g or more and 50 g or less. In light of obtaining greater inertia, the golf ball more preferably has a mass of 44 g or more, even more preferably 45.00 g or more. In light of satisfying a regulation of USGA, the golf ball preferably has a mass of 45.93 g or less.

When the golf ball has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

The above golf ball comprises a golf ball body and a paint film formed on a surface of the golf ball body, and preferably has a coefficient of friction of 0.35 or more and 0.60 or less calculated using a contact force tester.

In the present invention, the coefficient of friction calculated using the contact force tester is a coefficient of friction between the golf ball and a collision plate when the golf ball is allowed to collide with the collision plate disposed inclined at a predetermined angle to the flying direction of the golf ball. By using the contact force tester, a time function Fn(t) of contact force in a direction perpendicular to the collision plate and a time function Ft(t) of contact force in a direction parallel to the collision plate are concurrently measured, and a maximum value of a time function M(t) which is a ratio of Ft(t) to Fn(t) represented by the following equation is defined as a coefficient of friction.

$$M(t)=Ft(t)/Fn(t)$$

Figure 2:
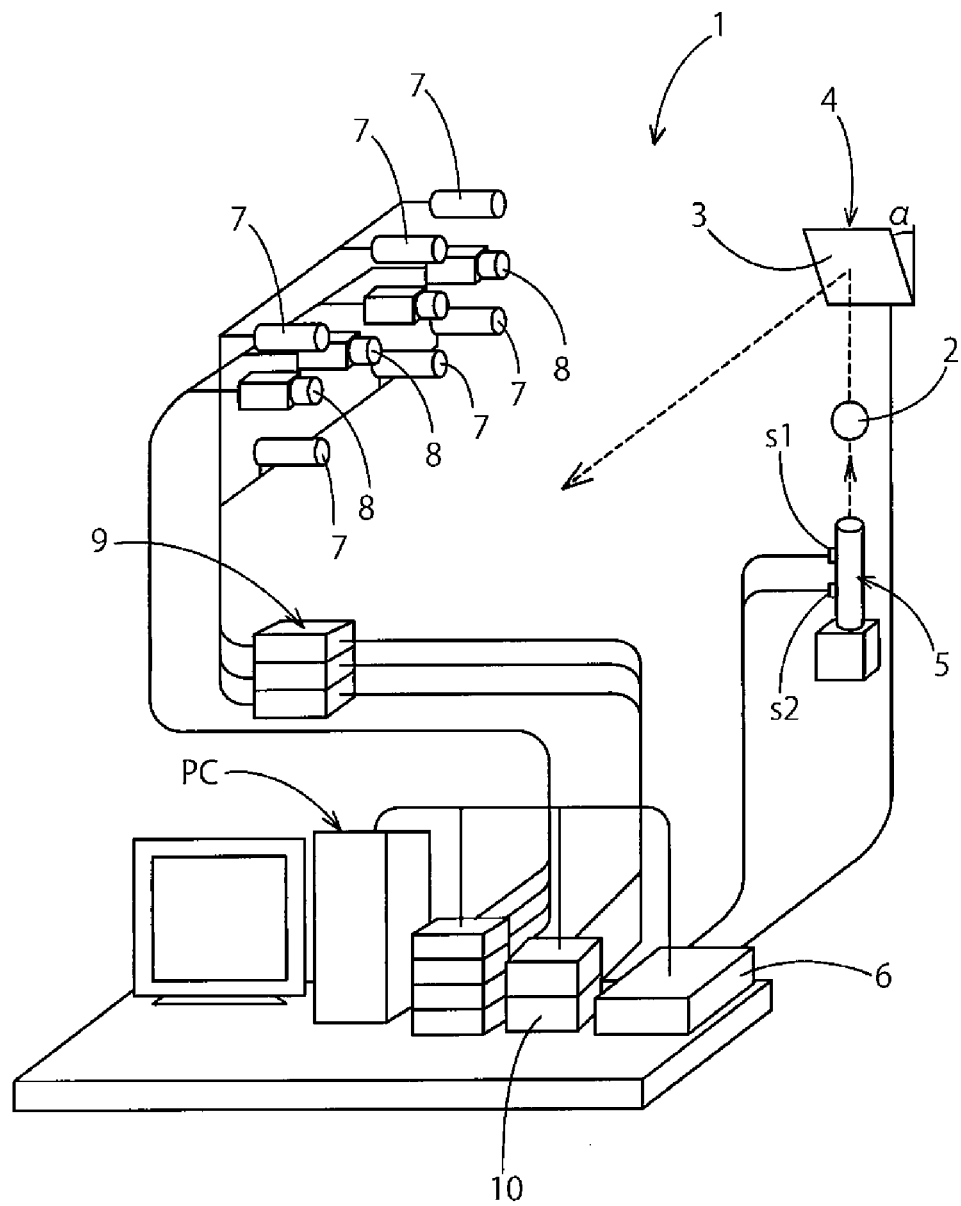
FIG. 2 is a schematic view of an example of a contact force tester used in the present invention.
Figure 3:
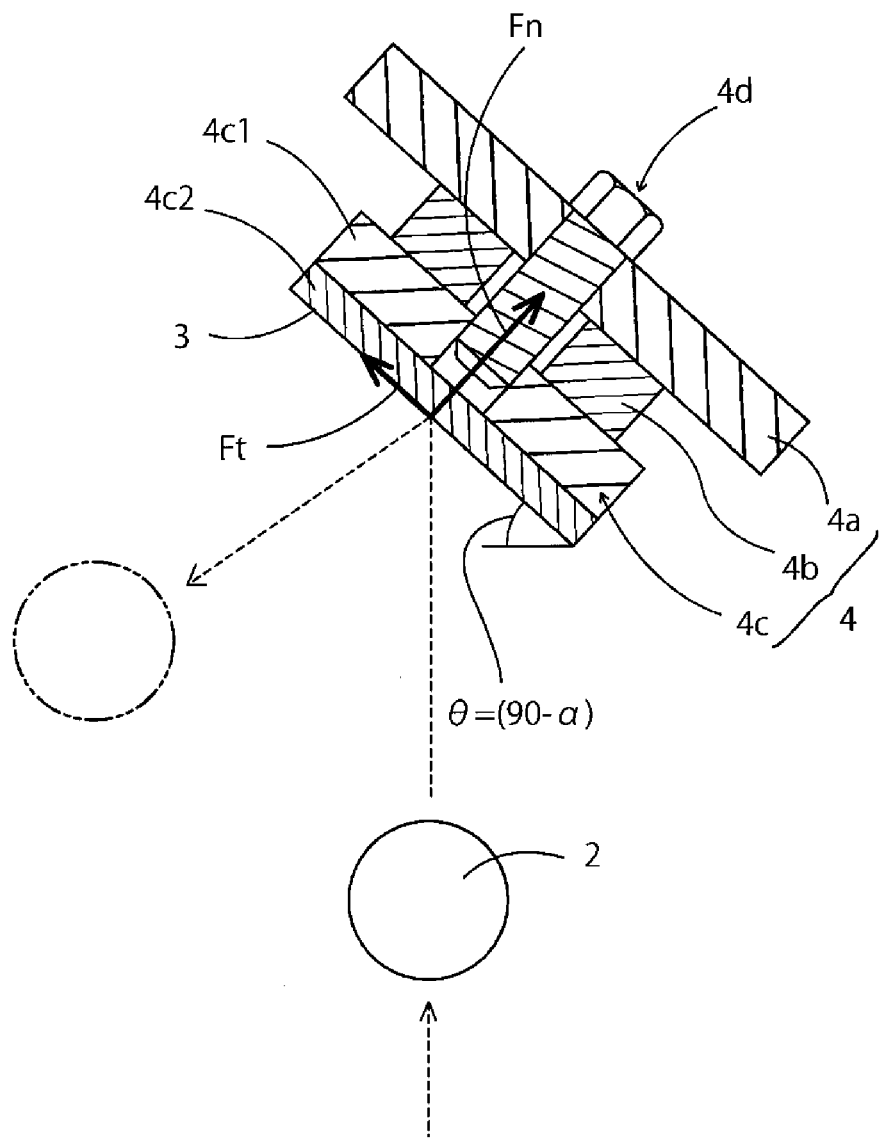
FIG. 3 is a partially enlarged cross-sectional view of a collision plate of the contact force tester.

In the present invention, the method of calculating the coefficient of friction will be described based on FIG. 2 to FIG. 4. FIG. 2 is a contact force tester for measuring the coefficient of friction. FIG. 3 is an enlarged cross-sectional view of a collision plate 4 that the golf ball is allowed to collide with.

The contact force tester 1 makes pseudo conditions of hitting a golf ball with a club face, and enables to measure various forces at that time. The contact force tester 1 includes, for example, a launcher 5 launching a golf ball 2 in an upward and perpendicular direction, and a collision plate 4 positioning on the upper side of the launched golf ball 2 and having a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may be set, for example, within the range of about 10 m/s to about 50 m/s. In the present invention, in light of the head speed of approach shots, the initial velocity is set to 19 m/s.

The desired value of the initial velocity of the golf ball 2 is set by the volume of a controller 6 or the like. Based on a distance between a first sensor S1 and a second sensor S2 provided in the launcher 5 and a time difference between interrupting these sensors, the controller 6 calculates the actually measured value of the initial velocity of the golf ball 2, and outputs the value to a computer device PC or the like.

FIG. 3 shows a partially enlarged cross-sectional view of the collision plate 4. The collision plate 4 can incline the striking face 3 at a predetermined angle α to the launching direction (flying direction) of the golf ball 2. In the present invention, an angle θ obtained by subtracting the angle α from 90 degree is defined as a collision angle. This collision angle θ corresponds to a loft angle of a club face (not shown) in an actual swing. Further, in view of the loft angle of a golf club, the collision angle θ is set to a plurality of values (e.g. 15°, 20°, 35° and the like), for example, within a range from 10° to 90°, and the measurement of the contact force, which will be described later, can be conducted at each angle. In the present invention, the collision angle θ is set to 55° in order to recreate the spin rate on approach shots.

The collision plate 4 comprises, for example, a base plate 4a formed from a metal plate material, a superficial plate 4c constituting the striking face 3, and a pressure sensor 4b interposed therebetween, which are fixed to one another with a bolt 4d integrally.

The base plate 4a may be formed from any material without particular limitation, as long as it has a predetermined strength and rigidity, but preferably formed from steel. The base plate 4a preferably has a thickness in a range from 5.0 mm to 20.0 mm. A model number of the main bolt 4d is, for example, M10 according to JIS.

As the pressure sensor 4b, for example, a 3-component force sensor is preferably used. Such sensor can measure, at least, a perpendicular force Fn in a direction perpendicular to the striking face 3, and a shear force Ft in a direction parallel to the striking face 3 (a direction from the sole side toward the crown side in a club face) as time-series data. The measurement of the force is conducted by connecting a charge amplifier or the like to the pressure sensor 4b.

As the pressure sensor 4b, a variety of products may be used, for example, a 3-component force sensor (model 9067) available from Kistler Instrument Corporation can be used. This sensor enables to measure force components in a parallel direction, a Y direction and a perpendicular direction. Although not illustrated, the measurement of the pressure is conducted by connecting a charge amplifier (model 5011B available from Kistler Instrument Corporation) to the pressure sensor 4b. The pressure sensor 4b is formed in its center with a through-hole through which the main bolt 4d is inserted to integrally fix the pressure sensor 4b to the base plate 4a.

The superficial plate 4c is composed of a main body 4c1 and a superficial material 4c2 disposed outside of the main body 4c1 to provide the striking face 3 and having an area large enough to collide with the golf ball 2. These are fixed with a bolt or the like, which is not illustrated, in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed from any material without limitation, but typically formed from stainless steel (SUS-630). The thickness of the main body 4c1 is typically in a range from 10 mm to 20 mm. Further, the main body 4c1 may have a substantially same planner shape as the pressure sensor 4b, for example, a square shape with a length of 40 mm to 60 mm on one side. Into the main body 4c1, the front end of the main bolt 4d is screwed. As a result, the pressure sensor 4b is interposed between the base plate 4a and the main body 4c1, and the position thereof is fixed.

The superficial material 4c2 providing the striking face 3 of the collision plate 4 may adopt various materials, planner shapes and surface structures, however, it is preferably formed from the same material as the face (not shown) of the golf club head which has been determined as an analysis subject beforehand. In the present invention, in view of evaluating a model of approach shots, SUS-431 stainless steel which is the same material as the head material of CG-15 available from Cleveland Golf is used as the superficial material 4c2. The thickness of the superficial material 4c2 may be arbitrarily changed, for example, within a range of 1.0 mm to 5.0 mm. The planner shape of the superficial material 4c2 may be substantially the same as that of the main body 4c1, for example, a square shape with a length of 40 mm to 60 mm on one side.

The contact force tester 1 comprises a strobe device 7 and a high speed type camera device 8 enabling to take a photograph of the collision between the golf ball 2 and the striking face 3 as well as the golf ball 2 rebounding from the striking face 3. The strobe device 7 is connected to a strobe power 9. The camera device 8 is connected to a camera power 10 via a capacitor box. The imaged data is memorized in the computer device PC or the like. By comprising these devices, a slipping velocity and a contact area at the time of the collision between the golf ball 2 and the striking face 3, and a launch speed, a launch angle and a backspin rate of a golf ball, which will be explained later, can be measured.

Figure 4:
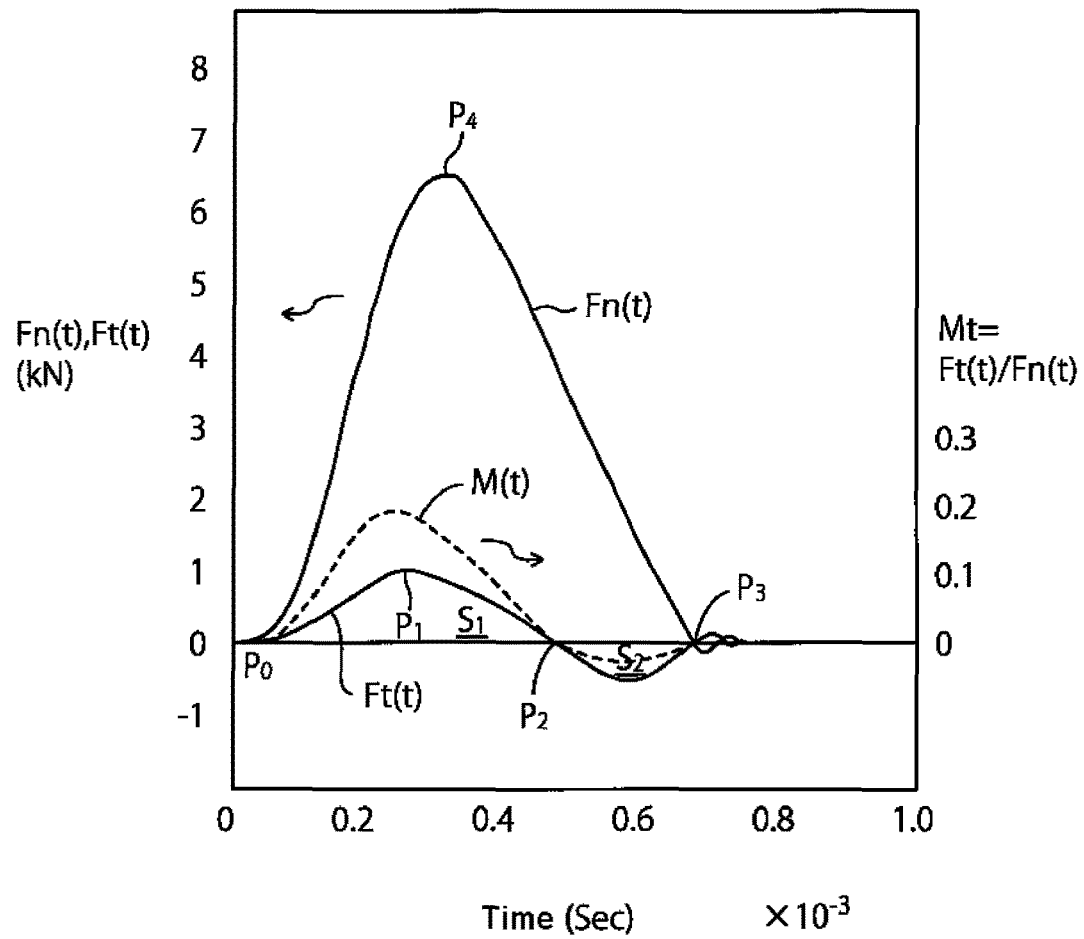
FIG. 4 is a graph illustrating an example of Ft(t), Fn(t) and M(t)

FIG. 4 shows a time history of the perpendicular force Fn and the shear force Ft applied to the striking face 3 at the time of the collision by the golf ball 2 measured with the contact force tester 1 under a specific condition.

FIG. 4 is a graph illustrating an example of Fn(t) and Ft(t) measured with the tester shown in FIGS. 2 and 3. In FIG. 4, a point P0 represents a point where the pressure sensor 4b starts sensing force, and generally corresponds to the point at which the striking face 3 and the golf ball 2 come into collision with each other. Fn(t) which is a contact force in the perpendicular direction gradually increases from the point P0, peaks at a point P4, and comes down therefrom to reach zero at a point P3. The point P3 represents a point where the pressure sensor 4b no longer senses force, and generally corresponds to the point where the golf ball 2 leaves the striking face 3.

On the other hand, the value of Ft(t) which is a contact force (i.e., shear force) in the direction parallel to the collision plate increases with time from the point P0, peaks at a point P1, and comes down therefrom to reach zero at a point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes a positive value within the region surrounded by the curve of Ft(t) and the time axis represents impulse where the shear force is positive. On the other hand, an area S2 of the region where Ft(t) takes a negative value within the region surrounded by the curve of Ft(t) and the time axis represents impulse where the shear force is negative. Impulse S1 acts in a direction promoting back spin, and impulse S2 acts in a direction inhibiting back spin. Here, impulse S1 takes a larger value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction obtained as described above is preferably 0.35 or more, more preferably 0.37 or more, even more preferably 0.39 or more, and is preferably 0.60 or less, more preferably 0.56 or less, even more preferably 0.54 or less. If the coefficient of friction falls within the above range, the spin rate on approach shots becomes better.

EXAMPLES

Hereinafter, the present invention will be described in detail by way of examples. However, the present invention is not limited to the examples described below, and various changes and modifications without departing from the gist of the present invention are included in the scope of the present invention.

[Evaluation Method]

(1) Slab Hardness (Shore D Hardness)

Sheets with a thickness of about 2 mm were produced by injection molding the resin composition, and stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D".

(2) Mechanical Properties of Cover

A sheet with a thickness of about 2 mm was produced by injection molding the cover composition, and stored at 23° C. for two weeks. According to ISO 527-1, a dumbbell-shape test piece (gauge length: 73 mm, width of parallel part: 5.0 mm) was prepared from the sheet, the mechanical properties of the test piece were measured using a tensile tester (tension speed: 100 mm/min, measurement temperature: 23° C.) available from Shimadzu Corporation, and the 10% elastic modulus (tensile stress at 10% strain) was calculated.

(3) Tensile Properties of Paint Film

The tensile properties of the paint film were measured according to JIS K7161 (2014). Specifically, the base agent and the curing agent were blended to prepare a paint, and the obtained paint was dried and cured at 40° C. for 4 hours to prepare a paint film (thickness: 0.05 mm). The paint film was punched out to prepare a test piece according to the test piece type 2 (width of parallel part: 10 mm, gauge length: 50 mm) prescribed in JIS K7127 (1999). The tensile test of the test piece was conducted using a precision universal tester (Autograph (registered trademark) available from Shimadzu Corporation) under testing conditions of a length between grips: 100 mm, a tensile speed: 50 mm/min and a testing temperature: 23° C.

(4) Measurement of Coefficient of Friction

The contact force tester shown in FIG. 2 was used to measure the coefficient of friction of the golf ball.

(4-1) Specification of Tester (A) Launcher: air gun system (B) Collision plate:

Base plate 4a
  Steel
  Thickness: 5.35 mm
Superficial plate 4c
  Main body 4c1
    Size: 56 mm×56 mm×15 mm
    Stainless steel (SUS-630)
  Superficial material 4c2
    Size: 56 mm×56 mm×2.5 mm
    Metal composition: SUS-431
    Groove shape: see FIG. 5
  Angle of inclination (a)
    35 degrees (to flying direction of golf ball)

(C) Pressure sensor 4b 3-component force sensor (model 9067) available from Kistler Instrument Corporation
Charge amplifier
  Model 5011B available from Kistler Instrument Corporation (D) Capture of contact force into PC A pulse counter board PCI-6101 (available from Interface Corporation) was used. With a 16-bit PCI pulse counter board having 4 channels, measurement suited for a specific application may be realized in four counter modes. The maximum input frequency is 1 MHz.

Figure 5:
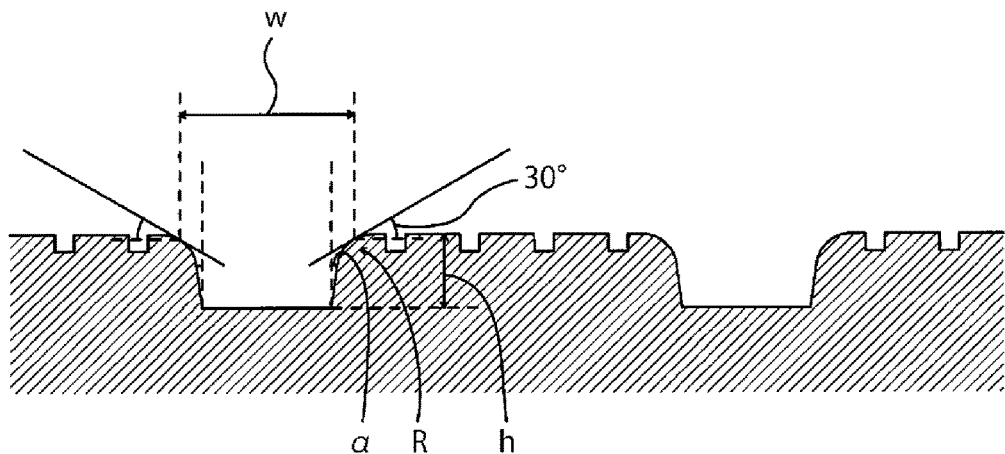
FIG. 5 is a cross-sectional view of a groove shape of a surface layer material of the contact force tester.
Figure 5:
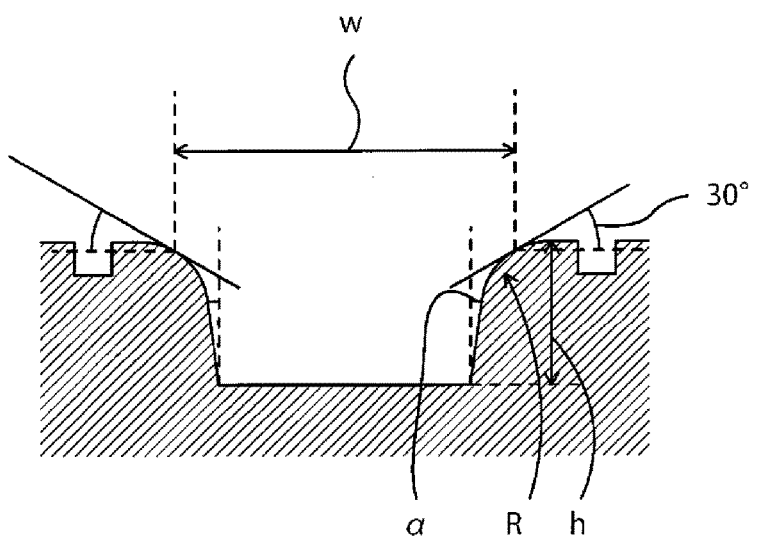

As shown in FIG. 5, the groove structure of a sand wedge CG-15 available from Cleveland Golf is reproduced on the striking face 3 of the collision plate 4. As shown in FIG. 5 (a), on the striking face 3, large grooves (zip grooves) are formed, and a plurality of small grooves are formed on the surface between the large grooves (zip grooves). FIG. 5 (b) is an enlarged view of cross-section structure of the zip groove. The dimensions of the zip groove are as follow.

Zip groove (groove) width W: 0.70 mm
Zip groove (groove) depth h: 0.50 mm
Zip groove (groove) pitch: 3.56 mm
Zip groove (groove) angle α: 10°
Zip groove shoulder R: 0.25

A plurality of small grooves between the zip grooves are formed by a laser-milling method such that the surface portion between the zip grooves has a surface roughness Ra=2.40±0.8 μm and Rmax=14.0±8 μm. It is noted that the surface roughness Ra and Rmax are measured by using SJ-301 available from Mitsutoyo Corporation under the conditions of specimen length=2.5 mm and cut off value=2.5 mm.

(4-2) Measuring Procedure

The coefficient of friction was measured according to the following method. The measurement temperature was 23° C. and the ball initial velocity was 19 m/s. The measurement was conducted twelve times for each golf ball, and the average value thereof was adopted as the measurement value of that golf ball. It is noted that the dry condition means that the measurement was conducted in a state that the collision plate and the golf ball were dry, and the wet condition means that the measurement was conducted in a state that the collision plate and the golf ball were wet with water.

(a) Setting the angle (α) of the collision plate at 35 degrees to the flying direction (vertical direction) of the golf ball;

(b) Adjusting the air pressure of the launcher 5;

(c) Launching the golf ball from the launcher at a speed of 19 m/s;

(d) Measuring the initial velocity of the golf ball from the preset distance between the sensor S1 and sensor S2 and the time difference between the times for the golf ball to interrupt the sensors S1 and S2;

(e) Measuring the contact force Fn(t) and contact force Ft(t), and calculating the maximum value of Ft(t)/Fn(t); and (f) Measuring the spin rate of the golf ball with the strobe device and the camera device.

(4-3) Result of Measurement

Figure 6:
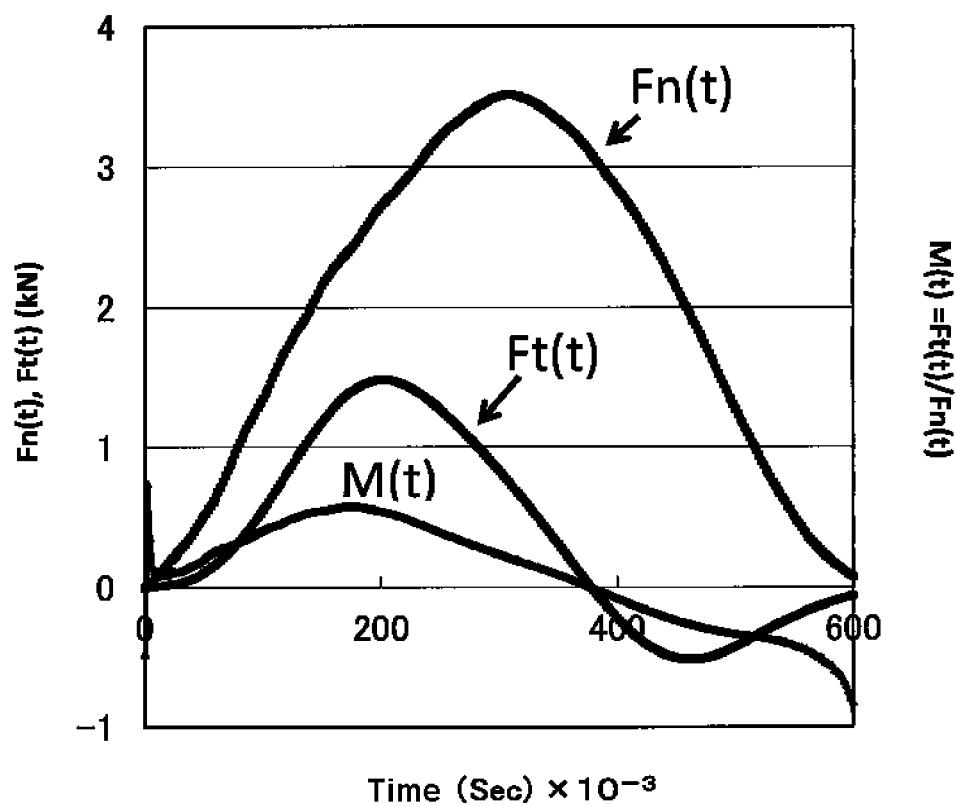
FIG. 6 is a graph illustrating an example of Ft(t), Fn(t) and M(t).

One example of the results obtained with the above tester in the above measuring procedure is shown in FIG. 6. From FIG. 6, the value of M(t) was calculated as Ft(t)/Fn(t), and the maximum value thereof was 0.58. Since noise tends to generate in initial period where the contact force rises up and in terminal period for measuring Ft and Fn, the maximum value of M(t) was calculated after trimming an early stage of the initial period and late stage of the terminal period.

(5) Spin Rate on Approach Shots (Dry Condition and Wet Condition)

A sand wedge (CG 15 forged wedge (52°) available from Cleveland Golf) was installed on a swing robot available from Golf Laboratories, Inc. The golf ball was hit at a head speed of 21 m/s, and the spin rate (rpm) thereof was measured by continuously taking a sequence of photographs of the hit golf ball. The measurement was conducted ten times for each golf ball, and the average value thereof was adopted as the spin rate. It is noted that the dry spin rate (Sd) is a spin rate measured in a state that the club face and the golf ball were dry, and the wet spin rate (Sw) is a spin rate measured in a state that the club face and the golf ball were wet with water.

(6) Shot Feeling

An actual hitting test was carried out by ten amateur golfers (high skilled persons) using a sand wedge (CG 15 forged wedge (52°) available from Cleveland Golf). In accordance with the number of people who answered the shot feeling was good (feeling like that the golf ball was lifted on the club face, feeling like that the golf ball gripped on the club surface, feeling like that the spin was imparted, feeling like that the golf ball was stuck on the club face, etc.), the golf balls were evaluated as follows.

E (Excellent): 8 or more
G (Good): 4 to 7
P (Poor): 3 or less (7) Stain Resistance The golf ball was immersed for 30 seconds in an aqueous solution of tincture of iodine obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wiped off, color tones (L, a, b) of the golf ball before and after the immersion were measured using a color difference meter (CM3500D available from Konica Minolta Inc.), and the color difference ($\Delta E$) was calculated according to the following equation. It is noted that a larger color difference value ($\Delta E$) means a larger color change extent.

$$\Delta E = [(\Delta L)^2 + (\Delta a)^2 + (\Delta b)^2]^{1/2}$$

Evaluation Standard

E (Excellent): $\Delta E$ is 15 or less
G (Good): $\Delta E$ is more than 15 and 20 or less
F (Fair): $\Delta E$ is more than 20 and less than 25
P (Poor): $\Delta E$ is 25 or more 1. Production of Center The center rubber composition having the formulation shown in Table 1 was mixed and kneaded, and heat-pressed in upper and lower molds, each having a hemispherical cavity, at 170° C. for 20 minutes to obtain the spherical center having a diameter 39.8 mm.

TABLE 1

| Center composition | Formulation (parts by mass) |
|---|---|
| Polybutadiene rubber | 100 |
| Zinc acrylate | 35 |
| Zinc oxide | 5 |
| Barium sulfate | Appropriate amount*) |
| Diphenyl disulfide | 0.5 |
| Dicumyl peroxide | 0.9 |

*)Barium sulfate: adjustment was made such that the golf ball had a mass of 45.3 g.
Polybutadiene rubber: "BR730 (high cis-polybutadiene)" available from JSR Corporation
Zinc acrylate: "ZN-DA90S" available from Nisshoku Techno Fine Chemical Co., Ltd.
Zinc oxide: "Ginrei R" available from Toho Zinc Co., Ltd.
Barium sulfate: "Barium Sulfate BD" available from Sakai Chemical Industry Co., Ltd.
Diphenyl disulfide: available from Sumitomo Seika Chemicals Co., Ltd.
Dicumyl peroxide: "Percumyl (register trademark) D" available from NOF Corporation 2. Preparation of Intermediate Layer Composition and Cover Composition The materials having the formulations shown in Tables 2, 3 were mixed with a twin-screw kneading extruder to prepare the intermediate layer composition and cover composition in a pellet form. The extruding conditions were a screw diameter of 45 mm, a screw rotational speed of 200 rpm, and screw L/D=35, and the mixtures were heated to 200° C. to 260° C. at the die position of the extruder.

TABLE 2

| Intermediate layer composition | Formulation (parts by mass) |
|---|---|
| Surlyn 8945 | 55 |
| Himilan AM7329 | 45 |
| Titanium dioxide | 4 |

Surlyn (registered trademark) 8945: sodium ion neutralized ethylene-methacrylic acid copolymer ionomer resin available from E.I. du Pont de Nemours and Company
Himilan (registered trademark) AM7329: zinc ion neutralized ethylene-methacrylic acid copolymer ionomer resin available from Du Pont-Mitsui Polychemicals Co., Ltd.

TABLE 3

| Cover composition | | |
|---|---|---|
| Formulation (parts by mass) | Elastollan XNY83A | 100 |
| | Titanium dioxide | 4 |
| | Ultramarine blue | 0.08 |
| Slab hardness (Shore D) | | 25 |
| 10% Modulus (kgf/cm$^2$) | | 16 |

Elastollan (registered trademark) XNY83A: thermoplastic polyurethane elastomer available from BASF Japan Ltd.

3. Production of Spherical Core

The intermediate layer composition obtained above was directly injection molded on the spherical center obtained as described above to form the intermediate layer (thickness: 1.0 mm) covering the spherical center, thereby obtaining the spherical core. Upper and lower molds for molding have a hemispherical cavity and a retractable hold pin for holding the spherical center. When molding the intermediate layer, the hold pin was protruded to hold the spherical center after the spherical center was charged, and the intermediate layer composition heated to 260° C. was charged for 0.3 second into the mold held under a pressure of 80 tons, and cooled for 30 seconds. The mold was opened and the spherical core was ejected.

4. Molding of Half Shell

The compression molding of the half shells was conducted by charging a pellet of the cover composition into each of the depressed part of the lower mold for molding half shells, and applying pressure to mold half shells. The compression molding was conducted under the conditions of a molding temperature of 170° C., a molding time of 5 minutes and a molding pressure of 2.94 MPa.

5. Molding of Cover

The spherical core obtained above was concentrically covered with two of the half shells, and the spherical core and two of the half shells were compression molded to obtain the cover (thickness: 0.5 mm). The compression molding was conducted under the conditions of a molding temperature of 145° C., a molding time of 2 minutes and a molding pressure of 9.8 MPa.

6. Preparation of Polyol Composition 6.1 Polyol Composition No. 1 (Urethane Polyol)

As a first polyol component, polytetramethylene ether glycol (PTMG, number average molecular weight: 650) and trimethylolpropane (TMP) were dissolved in a solvent (toluene and methyl ethyl ketone). The molar ratio (PTMG:TMP) was 1.8:1.0. Then, dibutyltin dilaurate which was used as a catalyst was added therein in an amount of 0.1 mass % with respect to the total amount of the base material. While keeping the temperature of the obtained polyol solution at 80° C., isophorone diisocyanate (IPDI) which was used as a first polyisocyanate component was added dropwise to the polyol solution and mixed. It is noted that the molar ratio (NCO/OH) of the NCO group in the polyisocyanate component to the OH group in the polyol component was 0.6. After adding of isophorone diisocyanate, stirring was continued until the isocyanate group no longer existed. Then, the reaction liquid was cooled to the room temperature to obtain the urethane polyol (amount of solid component: 30 mass %). In the obtained polyol composition No. 1, the amount of PTMG was 67 mass %, the hydroxyl value of the solid component was 67.4 mgKOH/g, and the urethane polyol had a weight average molecular weight of 4867.

6.2 Polyol Composition No. 2 (Polyrotaxane Composition)

50 parts by mass of a polyrotaxane ("SeRM (registered trademark) super polymer SH3400P (a polyrotaxane having a cyclodextrin, at least a part of hydroxyl groups thereof being modified with a caprolactone chain via —O—$C_3H_6$—O— group, a linear molecule of polyethylene glycol and a blocking group of an adamantyl group; molecular weight of linear molecule: 35,000, hydroxyl value: 72 mg KOH/g, total molecular weight of polyrotaxane: 700,000 in weight average molecular weight)" available from Advanced Softmaterials Inc.), 28 parts by mass of polycaprolactone polyol ("Placcel (registered trademark) 308" available from Daicel Chemical Industries, Ltd.), 22 parts by mass of a vinyl chloride-vinyl acetate-vinyl alcohol copolymer ("Solbin (registered trademark) AL (hydroxyl value: 63.4 mg KOH/g)" available from Nissin Chemical Industry Co., Ltd.), 0.1 part by mass of a modified silicone (DBL-C31 available from Gelest, Inc.), 0.01 part by mass of dibutyltin dilaurate, and 100 parts by mass of a solvent (a mixed solvent of xylene/methylethyl ketone=70/30 (mass ratio)) were mixed to prepared the polyol composition No. 2.

7. Preparation of Polyisocyanate Composition 7-1. Polyisocyanate Composition No. 1

30 parts by mass of an isocyanurate of hexamethylene diisocyanate (Duranate (registered trademark) TKA-100 (NCO amount: 21.7 mass %) available from Asahi Kasei Chemicals Corporation), 30 parts by mass of a biuret-modified product of hexamethylene diisocyanate (Duranate 21S-75E (NCO amount: 15.5 mass %) available from Asahi Kasei Chemicals Corporation), and 40 parts by mass of an isocyanurate of isophorone diisocyanate (Desmodur (registered trademark) Z 4470 (NCO amount: 11.9 mass %) available from Bayer company) were mixed. As a solvent, a mixed solvent of methyl ethyl ketone, n-butyl acetate and toluene was added therein to adjust the concentration of the polyisocyanate component as 60 mass %.

7-2. Polyisocyanate Composition No. 2

100 parts by mass of a biuret-modified product of hexamethylene diisocyanate (Duranate 21S-75E (NCO amount: 15.5 mass %) available from Asahi Kasei Chemicals Corporation), and 100 parts by mass of methyl ethyl ketone were mixed.

8. Paint

The paint formulations are shown in Table 4.

TABLE 4

| | Paint No. | 1 | 2 | 3 | 4 | 5 | 6 | 7 |
|---|---|---|---|---|---|---|---|---|
| Formulation | Polyol composition No. | No. 1 | No.1 | No.1 | No.1 | No.1 | No.1 | No. 2 |
| | Polyisocyanate composition No. | No. 1 | No.1 | No.1 | No.1 | No.1 | No.1 | No. 2 |
| | Mass ratio (base material/curing agent) | 100/9.2 | 100/15.8 | 100/17 | 100/24 | 100/29 | 100/38.6 | 100/17 |
| | Molar ratio (NCO/OH) | 0.38/1.0 | 0.65/1.0 | 0.7/1.0 | 1.0/1.0 | 1.2/1.0 | 1.6/1.0 | 1.03/1.0 |
| Properties of paint film | 10% elastic modulus (kgf/cm$^2$) | 7.9 | 75.0 | 100.0 | 150.0 | 186.4 | 274.9 | 8.2 |
| | 50% elastic modulus (kgf/cm$^2$) | 14.3 | 103.0 | 118.5 | 178.8 | 209.4 | 250.6 | 32.4 |
| | 100% elastic modulus (kgf/cm$^2$) | 21.9 | 143.0 | 161.1 | 240.0 | 278.6 | — | — |
| | Maximum elastic modulus (kgf/cm$^2$) | 119.8 | 184.0 | 195.0 | 276.7 | 337.1 | 293.3 | 40.2 |
| | Maximum elongation (%) | 260.5 | 152.0 | 140.0 | 114.5 | 120.7 | 76.4 | 51.4 |

9. Formation of Paint

The surface of the golf ball body obtained above was subjected to a sandblast treatment, and a mark was formed thereon. Then, the paint was applied to the golf ball body with a spray gun, and the paint was dried in an oven of 40° C. for 24 hours to obtain the golf ball having a mass of 45.3 g. The golf ball body was placed in a rotating member provided with three prongs, the rotating member was allowed to rotate at 300 rpm, and application of the paint was conducted by spacing a spray distance (7 cm) between the air gun and the golf ball body while moving the air gun in an up and down direction. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. It is noted that after the inner layer paint sprayed on the golf ball body was completely dried, the spraying of the outer layer paint was conducted. Evaluation results of the obtained golf balls are shown in Table 5.

TABLE 5

| Golf ball No. | | A | B | C | D | E | F | G | H | I | J | K |
|---|---|---|---|---|---|---|---|---|---|---|---|---|
| Outer layer | Paint No. | 2 | 3 | 4 | 5 | 6 | 5 | 1 | 3 | 5 | 5 | 7 |
| | 10% elastic modulus $M_{out}$ (kgf/cm$^2$) | 75.0 | 100.0 | 150.0 | 186.4 | 274.9 | 186.4 | 7.9 | 100.0 | 186.4 | 186.4 | 8.2 |
| | Maximum elongation (%) | 152.0 | 140.0 | 114.5 | 120.7 | 76.4 | 120.7 | 260.5 | 140.0 | 120.7 | 120.7 | 51.4 |

TABLE 5-continued

| Golf ball No. | | A | B | C | D | E | F | G | H | I | J | K |
|---|---|---|---|---|---|---|---|---|---|---|---|---|
| Inner layer | Thickness (μm) | 10 | 10 | 10 | 10 | 10 | 10 | 10 | 10 | 10 | 10 | 10 |
| | Paint No. | 2 | 2 | 2 | 2 | 2 | 5 | 1 | 1 | 1 | 7 | 7 |
| | 10% elastic modulus $M_{in}$ (kgf/cm$^2$) | 75.0 | 75.0 | 75.0 | 75.0 | 75.0 | 186.4 | 7.9 | 7.9 | 7.9 | 8.2 | 8.2 |
| | Maximum elongation (%) | 152.0 | 152.0 | 152.0 | 152.0 | 152.0 | 120.7 | 260.5 | 260.5 | 260.5 | 51.4 | 51.4 |
| | Thickness (μm) | 10 | 10 | 10 | 10 | 10 | 10 | 10 | 10 | 10 | 10 | 10 |
| 10% elastic modulus difference ($M_{out} - M_{in}$) (kgf/cm$^2$) | | 0 | 25.0 | 75.0 | 111.4 | 199.9 | 0 | 0 | 92.1 | 178.5 | 178.2 | 0 |
| Total thickness (μm) | | 20 | 20 | 20 | 20 | 20 | 20 | 20 | 20 | 20 | 20 | 20 |
| Dry condition | Spin rate (rpm) | 6440 | 6480 | 6490 | 6520 | 6530 | 6520 | 6400 | 6430 | 6445 | 6420 | 6380 |
| | Coefficient of friction | 0.621 | 0.606 | 0.597 | 0.586 | 0.574 | 0.500 | 0.642 | 0.622 | 0.611 | 0.628 | 0.655 |
| Wet condition | Spin rate (rpm) | 3600 | 3800 | 4050 | 4130 | 4210 | 4420 | 3380 | 3740 | 4080 | 4060 | 3210 |
| | Coefficient of friction | 0.168 | 0.180 | 0.198 | 0.206 | 0.218 | 0.225 | 0.152 | 0.171 | 0.204 | 0.201 | 0.150 |
| Spin rate ratio (wet/dry) | | 0.56 | 0.59 | 0.62 | 0.63 | 0.64 | 0.68 | 0.53 | 0.58 | 0.63 | 0.63 | 0.50 |
| Shot feeling | | G | G | G | G | G | P | E | G | G | G | E |
| Stain resistance | | F | G | G | G | E | G | P | G | G | G | P |

The golf balls No. B to E and H to J are the cases that a difference ($M_{out}-M_{in}$) between a 10% elastic modulus ($M_{out}$) of an outermost layer of the paint film and a 10% elastic modulus ($M_{in}$) of an innermost layer of the paint film is 25 kgf/cm$^2$ or more. These golf balls No. B to E and H to J have a high spin rate under a dry condition as well as under a wet condition. Further, these golf balls No. B to E and H to J are also excellent in stain resistance since the outermost layer of the paint film thereof has a 10% elastic modulus ($M_{out}$) of 100 kgf/cm$^2$ or more. Furthermore, these golf balls No. B to E and H to J are also excellent in shot feeling since the innermost layer of the paint film thereof has a 10% elastic modulus ($M_{in}$) of less than 100 kgf/cm$^2$.

The golf balls No. A, F, G and K are the cases that the difference ($M_{out}-M_{in}$) is less than 25 kgf/cm$^2$. These golf balls No. A, G and K have a low spin rate under a wet condition, even though they have a high spin rate under a dry condition. The golf ball No. F has a small coefficient of friction under a dry condition, even though it has excellent spin performance under a wet condition. Thus, it is estimated that the golf ball No. F has a decreased spin rate when the head speed on approach shots is slow.

This application is based on Japanese patent application No. 2015-242037 filed on Dec. 11, 2015, the contents of which are hereby incorporated by reference.

The invention claimed is:

1. A golf ball comprising a golf ball body and a paint film formed on a surface of the golf ball body, wherein the paint film has a multi-layered construction composed of two or more layers, and a difference ($M_{out}-M_{in}$) between a 10% elastic modulus ($M_{out}$) of an outermost layer of the paint film and a 10% elastic modulus ($M_{in}$) of an innermost layer of the paint film is 25 kgf/cm$^2$ or more, and the 10% elastic modulus ($M_{out}$) of the outermost layer of the paint film is 100 kgf/cm$^2$ or more.

2. The golf ball according to claim 1, wherein the 10% elastic modulus ($M_{in}$) of the innermost layer of the paint film is less than 100 kgf/cm$^2$.

3. The golf ball according to claim 1, wherein the outermost layer of the paint film has a thickness ($T_{out}$) ranging from 5 μm to 30 μm, and the innermost layer of the paint film has a thickness ($T_{in}$) ranging from 5 μm to 30 μm.

4. The golf ball according to claim 1, wherein a base resin constituting the paint film includes a polyurethane.

5. The golf ball according to claim 4, wherein a polyol composition constituting the polyurethane contains a urethane polyol, wherein the urethane polyol includes a polyether diol having a number average molecular weight in a range from 600 to 3000 as a constituent component.

6. The golf ball according to claim 5, wherein the urethane polyol has a weight average molecular weight ranging from 5000 to 20000.

7. The golf ball according to claim 5, wherein the urethane polyol has a hydroxyl value ranging from 10 mgKOH/g to 200 mgKOH/g.

8. The golf ball according to claim 5, wherein the urethane polyol further includes a triol as a constituent component.

9. The golf ball according to claim 8, wherein a mass ratio (triol/polyether diol) of the triol to the polyether diol ranges from 0.2 to 6.0.

10. The golf ball according to claim 5, wherein a polyisocyanate composition constituting the polyurethane contains at least one selected from the group consisting of a biuret-modified product of hexamethylene diisocyanate, an isocyanurate of hexamethylene diisocyanate, and an isocyanurate of isophorone diisocyanate.

11. The golf ball according to claim 10, wherein the biuret-modified product of hexamethylene diisocyanate and the isocyanurate of hexamethylene diisocyanate are used in combination, and a mass ratio (biuret-modified product/isocyanurate) of the biuret-modified product of hexamethylene diisocyanate to the isocyanurate of hexamethylene diisocyanate ranges from 20/40 to 40/20.

12. The golf ball according to claim 4, wherein a polyol composition constituting the polyurethane contains a polyrotaxane, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

13. The golf ball according to claim 12, wherein the polyol composition further contains a polycaprolactone polyol, and a mass ratio (polycaprolactone polyol/polyrotaxane) of the polycaprolactone polyol to the polyrotaxane ranges from 5/95 to 90/10.

14. The golf ball according to claim 12, wherein the polyol composition further contains a hydroxyl group modified vinyl chloride-vinyl acetate copolymer, and an amount of the hydroxyl group modified vinyl chloride-vinyl acetate copolymer in a polyol component of the polyol composition ranges from 4 mass % to 50 mass %.

15. The golf ball according to claim 12, wherein the polyol composition further contains a modified silicone.

16. The golf ball according to claim 12, wherein a polyisocyanate composition constituting the polyurethane contains an isocyanurate of hexamethylene diisocyanate.

17. The golf ball according to claim 1, wherein the golf ball body comprises a core and a cover covering the core, and the cover has a slab hardness of 60 or less in Shore D hardness.

18. The golf ball according to claim 1, wherein the golf ball body comprises a core and a cover covering the core, and the cover has a 10% elastic modulus of less than 120 kgf/cm$^2$.

19. The golf ball according to claim 1, wherein the golf ball has a coefficient of friction ranging from 0.35 to 0.60 calculated using a contact force tester.

20. A golf ball comprising a golf ball body and a paint film formed on a surface of the golf ball body, wherein the paint film has a multi-layered construction composed of two or more layers, and a difference ($M_{out}$–$M_{in}$) between a 10% elastic modulus ($M_{out}$) of an outermost layer of the paint film and a 10% elastic modulus ($M_{in}$) of an innermost layer of the paint film is 25 kgf/cm$^2$ or more, and wherein a base resin constituting the paint film includes a polyurethane, and a polyol composition constituting the polyurethane contains a polyrotaxane, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

21. The golf ball according to claim 20, wherein the polyol composition further contains a polycaprolactone polyol, and a mass ratio (polycaprolactone polyol/polyrotaxane) of the polycaprolactone polyol to the polyrotaxane ranges from 5/95 to 90/10.

22. The golf ball according to claim 20, wherein the polyol composition further contains a hydroxyl group modified vinyl chloride-vinyl acetate copolymer, and an amount of the hydroxyl group modified vinyl chloride-vinyl acetate copolymer in a polyol component of the polyol composition ranges from 4 mass % to 50 mass %.

23. The golf ball according to claim 20, wherein the polyol composition further contains a modified silicone.

24. The golf ball according to claim 20, wherein a polyisocyanate composition constituting the polyurethane contains an isocyanurate of hexamethylene diisocyanate.

* * * * *